United States Patent [19]

Kunkle

[11] 3,963,965

[45] June 15, 1976

[54] SURGE ARRESTER CONSTRUCTION

[75] Inventor: Ned T. Kunkle, Bloomington, Ind.

[73] Assignee: Westinghouse Electric Corporation, Pittsburgh, Pa.

[22] Filed: Oct. 22, 1974

[21] Appl. No.: 516,922

[52] U.S. Cl. .................................... 317/61; 315/36; 317/70

[51] Int. Cl.[2] .......................................... H02H 9/06

[58] Field of Search .................. 317/61, 69, 70, 67; 315/36

[56] References Cited

UNITED STATES PATENTS 3,091,721 5/1963 Yost .................................... 317/61

3,859,569 1/1975 Kresge ................................ 317/70

*Primary Examiner*—R. N. Envall, Jr.
*Assistant Examiner*—Harry E. Moose, Jr.
*Attorney, Agent, or Firm*—G. H. Telfer

[57] ABSTRACT

An arrester is provided in a staggered stack of two columns of elements alternately disposed at substantially 90° with respect to each other in successive levels of the columns. Plates of conductive material are at the ends of the stack and between successive levels for electrically and mechanically securing arrester elements thereon with auxiliary capacitors and resistors located between selected plates.

5 Claims, 6 Drawing Figures

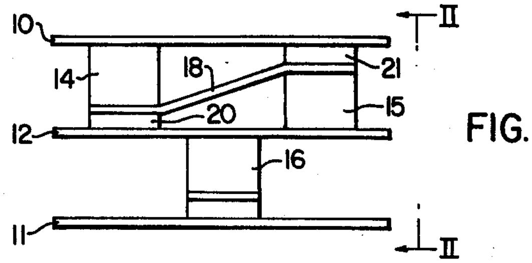
FIG.1.
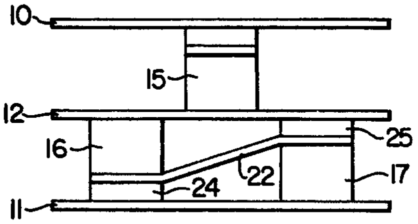
FIG.2.
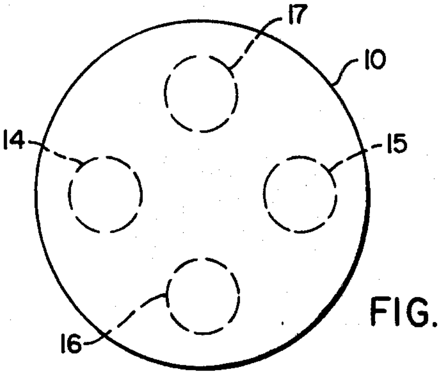
FIG.3.
FIG. 4.
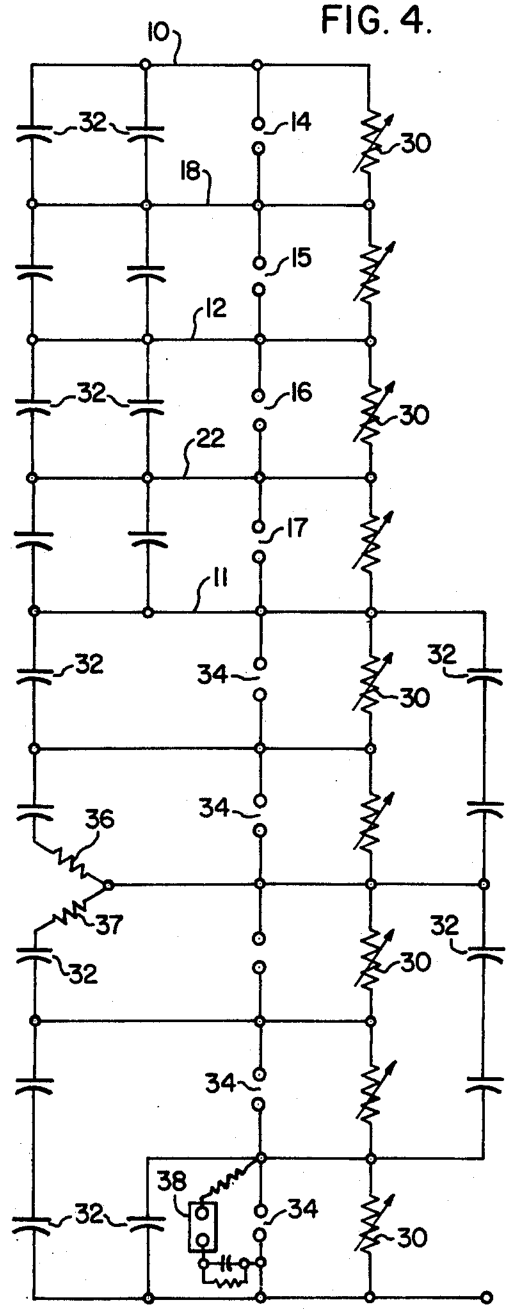
FIG.5.
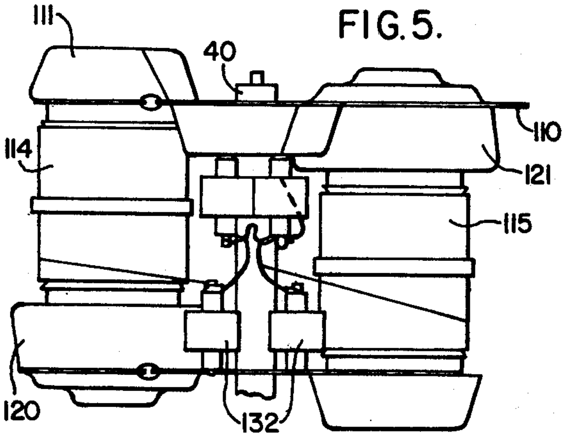
FIG.6.
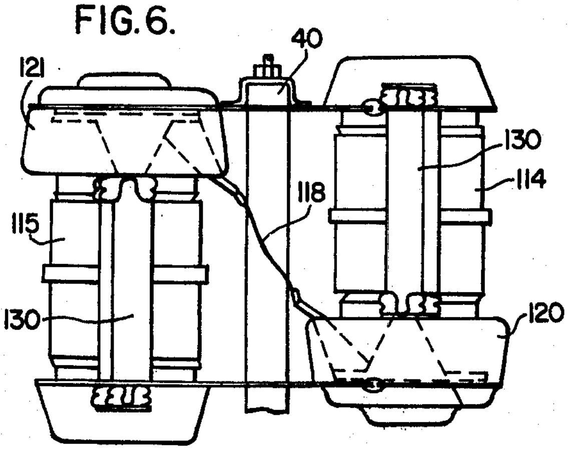

SURGE ARRESTER CONSTRUCTION

BACKGROUND OF THE INVENTION

This invention relates to electrical surge arresters, such as lightning arresters, for protection of electrical equipment.

Arresters of substantial voltage rating, such as up to hundreds of kilowatts, normally require a plurality of electrical valve blocks and spark gaps in an electrical path whose arrangement is influenced by a number of electrical, mechanical, and economic design considerations. It has been previously recognized that the elements in the electrical path are preferably not arranged in a single linear string but rather are in a staggered stack. This results in the advantage of compactness while avoiding close proximity of elements between which undesired arcing is to be minimized. There is need however to provide adequate room to accommodate voltage grading resistor and capacitor elements and also control gap elements such as are called for by the circuit arrangements of Harder U.S. Pat. No. 3,510,726, May 5, 1970, and Osterhout U.S. Pat. No., 3,611,044, Apr. 16, 1971. A variety of such arrangements have been manufactured and used successfully. Kennon U.S. Pat. No. 3,534,221, Oct. 13, 1970, discloses examples of a prior art structural arrangement.

There remains interest in developing designs that achieve the required electrical functions while being improved with respect to ease of fabrication, economy of components, and mechanical stability in handling during fabrication, shipment, and installation. The present invention achieves improvements in those qualities.

SUMMARY OF THE INVENTION

An arrester is provided in staggered stack of two columns of elements alternately disposed at substantially 90° with respect to each other in successive levels of the columns. End plates are provided at each end of the stack and an intermediate, or center, plate is provided between each pair of adjacent levels. The plates are conductive and have surfaces transverse to the stack axis on which are made electrical and mechanical connections to the arrester elements located therebetween. The plate surfaces have an area substantially larger, by at least a factor of two, than the cross-sectional area of the arrester elements on the surfaces. This gives a quality of openness to the structure that means there is ample space available for auxiliary components such as grading resistors and capacitors, which are at selected locations electrically in parallel with main arrester elements. There is also ample space available for conductive connections (called stack connectors) that extend from the end of one stack to the opposite end of the other stack on the same level.

A central tie rod extends through the entire stack and secures it in a unitary assembly which can be located in an insulating housing.

Additional features of the invention relate to the arrangement of arrester components in a column at an individual level of the stack. In a preferred form there is, in succession, a plate, one or more arrester elements (e.g. a valve block, a spark gap, and second valve block), an insulator and a second plate. The second valve block has a stack connector joined to it (between that valve block and the adjacent insulator). That stack connector extends back up to the opposite end of the other column (between the same two plates) where the sequence of elements is reversed. This arrangement results in minimizing the required number of insulators and stack connections.

Prior known designs of stagger stacked columns have used three columns resulting in relative crowding of the structure that limits the facility of providing auxiliary components. Such designs have also required additional numbers of insulators or both additional insulators and stack connections.

Additional features of the present invention will become apparent by reference to the ensuing more detailed description.

BRIEF DESCRIPTION OF THE DRAWING

FIGS. 1 and 2 are respectively front and side elevation views of an embodiment of the present invention;

FIG. 3 is top plan view of the embodiment of FIGS. 1 and 2;

FIG. 4 is a circuit schematic of a typical surge arrester that may be constructed in accordance with the present invention; and, FIGS. 5 and 6 are respectively front and rear views of a portion of a further embodiment of the invention.

PREFERRED EMBODIMENTS

In FIGS. 1–3 are generalized views showing a basic arrangement in accordance with the invention, without auxiliary components. It includes a pair of conductive end plates 10 and 11 and a conductive center plate 12. Between end plate 10 and center plate 12 are two columns of arrester elements 14 and 15 and between center plate 12 and end plate 11 are two columns of arrester elements 16 and 17. A conductive stack connector 18 extends from the lower end of column 14, where it is spaced from plate 12 by insulator 20, to the upper end of column 15, where it is spaced from plate 10 by insulator 21. A second conductive stack connector 22 extends from the lower end of column 16, where it is spaced from plate 11 by insulator 24, to the upper end of column 17— where it is spaced from plate 12 by insulator 25. The combination as shown provides a series electrical path through the following sequence of elements: plate 10, column 14, connector 18, column 15, plate 12, column 16, connector 22, column 17, and plate 11.

As in conventional devices, end plates 10 and 11 are to be provided with terminals, not illustrated, for connection to the protected equipment or to ground, and the assembly will be provided in a suitable housing, not illustrated, such as of porcelain. Also to be understood is the fact the two level stack shown is for general illustration as practical devices will often have several levels which in general form will repeat those shown.

End plates 10 and 11 and center plate 12 are generally planar. In their preferred forms, as will be shown by subsequent embodiments, some variations from strict planarity will be shown. The plates 10, 11 and 12 are mutually parallel. A generally circular plate (FIG. 3) is convenient and suitable for each of the plates 10, 11, and 12 although it will be understood it need not be circular nor need it be closed as apertures where no conductive engagement is required are acceptable. For marked reduction of material, yet at risk of impairing mechanical stability, the plate may comprise a wire like frame of suitable rigidity.

One or more tie rods, suitably insulated, may be used to secure the plates together. Preferably, as will be subsequently shown, the arrangement includes a single, centrally located, tie rod.

The columns 14, 15, 16, and 17 of arrester elements may each be conventional types of valve block and spark gap combinations. Normally each column 14–17 will include at least one valve block and at least one spark gap; preferably each comprises a valve block, a spark gap, and a second valve block in sequence.

The number and arrangement of the columns 14–17 is particularly significant to the invention. As shown, two columns 14 and 15 are between plates 10 and 12 and two columns 16 and 17 are between plates 11 and 12. Use of a single column at each level would be less compact. More than two columns at each level has been a prior practice that results in relative crowding making fabrication with auxiliary components difficult. To avoid such crowding by enlargement of plate area would be undesirable in commercial practice. Also, three, or more, columns between two conductive plates means additional design complexity is incurred (at least additional insulators) since the intent is to get all the columns of arrester elements in series.

The columns 14 and 15 at one level are diametrically opposite each other relative to the axial center of the structure and the columns 16 and 17 at the second level are also diametrically opposite each other but rotated substantially 90°. Ninety degrees displacement is preferred but the intent is primarily to displace the locus of the columns from each other, as shown in FIG. 3, without overlap, so an exact 90° displacement is not critical.

Of further significance is the uniformity and simplicity of the columns 14–17 and their relation to the adjacent plates. As shown, column 14 and insulator 20 may be, and preferably are, identical to, but reversed in longitudinal orientation, column 15 and insulator 21.

FIG. 4 shows a circuit schematic of a typical lightning arrester that is an example of one that may be fabricated in accordance with the present invention. Horizontal lines 10, 18, 12, 22 and 11 correspond to the respectively numbered plates and connecting straps of FIGS. 1–3. Spark gaps 14 to 17 correspond to the respectively numbered columns of valve block and gap assemblies of FIGS. 1–3. Additionally, FIG. 4 shows auxiliary components that are associated with the referred to gap elements and can be located in the assembly between the appropriate conductive elements. These include resistors 30 and capacitors 32 related to those gap elements.

FIG. 4 also shows series gap elements 34 in addition to those shown in FIGS. 1–3 that are intended to be provided by additional levels of plates and other elements in similar arrangement to complete a typical arrester device. More of the resistors 30 and capacitors 32 are associated with the additional gaps 34. Approximately intermediate the stack are resistors 36 and 37 connected as shown in series with certain ones of the capacitors 32 for providing what is referred to as "front of wave" resistors as is known in the art. The elements of FIG. 4 from the top vertically down to the element 11 are typical for a non-cascading section of an arrester while those below are typical for a cascade section of an arrester. At the lower end of the stack is a control gap 38, with associated components, connected across the lower series gap.

The circuit of FIG. 4 exemplifies well known arrester technology, such as is described in the patents referred to previously. Accordingly, the present description will not further describe the electrical functioning of the components of FIG. 4. Rather it is intended to illustrate in FIG. 4 a representative device with its elements that can be assembled in accordance with the invention.

FIGS. 5 and 6 illustrate in greater detail a single arrester level that can be used in a non-cascading section of actual device. FIGS. 5 and 6 are respectively front and rear views of the same level of elements. Plate 110, corresponding to plate 10 of FIG. 1, has a dish-shaped portion 111 to accomodate the end of gap column 114. Plate 110 also has an aperture in which is located dish-shaped insulator 121. (The reference numerals of FIGS. 5 and 6 correspond in their last two digits to the corresponding elements of FIGS. 1–4). Resistors 130 and capacitors 132 are located as shown to complete this level of elements.

As many levels generally similar to that of FIGS. 5 and 6 as are required may be used to complete the device with selected auxiliary elements connected between the plates. A central insulated tie rod 40 extends through the plates and secures them all in a unitary structure between end plates. Each end plate may differ from each of the intermediate plates in that the end plates are each associated with two columns of gap elements while the intermediate plates are each associated with four columns of gap elements. Thus the provision of metal dish-shaped portions and apertures for location of dish-shaped insulators may be varied accordingly. However, it is adequate for their respective functions and convenience in fabrication to use plates as end plates that are like the intermediate plates.

Additional flexibility of design and convenience of fabrication are provided by reason of the fact the plate surfaces are larger in area, by at least a factor of two, than the area occupied by the arrester columns, as for example is shown in FIG. 3. This means the remaining space between plates is readily accessible for location of auxiliary components and those components can be selected more freely as to type and size in keeping with their required electrical functions.

The design of this invention thus allows fabrication of a mechanically secure structure while allowing each arrester section to be optimized electrically. The construction provides improved shipping capability, improves impact and shock resistance while also minimizing arcing between internal and external elements.

I claim:

1. An electrical surge arrester comprising: first, second and third conductive plates, each generally planar and parallel spaced from each other; first and second columns of arrester elements between said first and second plates, said first column having a first extremity in conductive engagement with said first plate and a second extremity spaced by a first insulator from said second plate, said second column having a first extremity spaced by a second insulator from said first plate and a second extremity in conductive engagement with said second plate; and third and fourth columns of arrester elements between said second and third plates, said third column having a first extremity in conductive engagement with said second plate and a second extremity spaced by a third insulator from said third plate, said fourth column having a first extremity spaed by a fourth insulator from said second plate and a second extremity in conductive engagement with said third plate; a first connector connecting said second extremity of said first column with said first extremity of said second column and a second connector connecting said second extremity of said third column and said first extremity of said fourth column to form a series electrical connection in sequence including said first plate, said first column, said first connector, said second column, said second plate, said third column, said second connector, said fourth column and said third plate.

2. An electrical surge arrester as in claim 1 wherein: said first and second columns are diametrically opposed to each other in relation to a center line extending perpendicularly through said plates and said third and fourth columns are diametrically opposed to each other in relation to said center line, said third and fourth columns being displaced by an angle in relation to said first and second columns so the axial projections thereof do not overlap said first and second columns.

3. An electrical surge arrester as in claim 2 wherein: said angle is approximately 90°.

4. An electrical surge arrester as in claim 1 wherein: at least one resistive voltage grading element and at least one capacitive voltage grading element are connected between each of said first and second plates and said second and third plates.

5. An electrical surge arrester as in claim 1 wherein: said conductive plates each have a dish-shaped metal portion making said conductive engagement with one of said columns of arrester elements and each have an aperture in which is located one of said insulators, said insulators being of dish-shaped configuration.

* * * * *